3,076,782
AGENTS ABSORBING ULTRAVIOLET RAYS
Reinhard Mohr and Hasso Hertel, Offenbach (Main), Germany, assignors to Farbwerke Hoechst Aktiengesellschaft vormals Meister Lucius & Brüning, Frankfurt am Main, Germany, a corporation of Germany
No Drawing. Filed Sept. 29, 1959, Ser. No. 843,049
Claims priority, application Germany Oct. 4, 1958
2 Claims. (Cl. 260—45.8)

We have found that derivatives of 2-phenyl-benztriazol-1-oxide can be used with special advantage as agents absorbing ultraviolet rays. Compounds of the following general formula

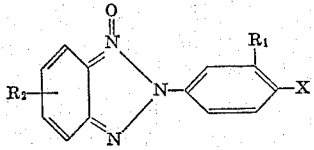

wherein X represents a hydroxy, alkoxy, acyloxy, arylsulfoxy, amino, alkylamino, dialkylamino, arylamino, diarylamino, alkylarylamino, acylamino or arylsulfonylamino group and $R_1$ represents a hydrogen atom, a halogen atom, an alkyl, carboxylic acid or carboxylic acid ester group or a carboxylic acid amide group which may be substituted, are especially suitable for use as agents absorbing ultraviolet rays. The symbol $R_2$ indicated in the left portion of the above formula means that the benzene nucleus of the benztriazol system may be substituted in any desired manner by a halogen atom, an alkyl or sulfonic acid group. The term "alkyl groups" as used herein is intended to mean straight chain, branched, saturated or unsaturated hydrocarbon radicals carrying from 1-18 carbon atoms, the term "acyl groups" to mean the radicals of organic carboxylic acids containing up to 18 carbon atoms, and the term "aryl groups" to mean aromatic radicals, such as phenyl, α- or β-naphthyl groups.

The invention also provides a process for making the above compounds, wherein a diazotized o-nitraniline is coupled with a hydroxybenzene or amino-benzene, the resulting o-nitrazobenzene is reduced with ring closure using, for example, sodium dithionite ($Na_2S_2O_4$) as the reducing agent to obtain a correspondingly substituted derivative of 2-phenyl-benztriazol-1-oxide. The derivatives so obtained can be further modified, if desired, by subjecting them to an appropriate chemical reaction, for example by alkylation or acylation of the free hydroxy group or amino group. The compounds according to this invention can also be made by oxidizing an o-amino-azo-compound, for example with chromic acid, to convert it into the corresponding benztriazol and oxidizing the benztriazol so obtained with hydrogen peroxide, for example, to obtain the benztriazol oxide.

The compounds so obtained constitute colorless or slightly yellow crystalline products depending on the nature of the substituents used. They absorb, substantially completely ultraviolet rays having a wave length of 380 mμ and less while they are substantially permeable to visible radiation having a wave length of >400 mμ. The sharp slope of their absorption curves lies directly at the boundary between the visible and the ultraviolet ranges of the spectrum. The compounds according to this invention can therefore be used for freeing the sunlight or any artificial light completely from its ultraviolet rays without the visible range of the spectrum being substantially impaired.

The above compounds absorbing ultraviolet rays can be used with special advantage by incorporating them into plastic materials, resins or lacquers whereby films or coatings are obtained which can be used for protecting other materials from the action of ultraviolet radiation, while simultaneously the plastic material, resins or lacquers themselves are considerably less sensitive to ultraviolet radiation. It is known that many high molecular organic substances are more or less decomposed by the action of ultraviolet rays whereby the physical and chemical properties of these substances are unfavorably changed. This unfavorable effect can be avoided or at least substantially reduced by incorporating in these materials a small amount of a substance absorbing ultraviolet light.

The compounds absorbing ultraviolet rays can be incorporated in plastic material or resins in the most various ways. In the simplest case, the dry, powdery material is mixed with a powdery or granular plastic or resin and the resulting mixture is then worked up in an appropriate manner, for example by pressing, injection moulding or extrusion. Alternatively, a finely distributed polymeric material or polycondensation product obtained in an aqueous suspension or emulsion may be admixed directly in this suspension or emulsion with the agent absorbing ultraviolet rays, the agent being used in the form of a powder, dispersion or solution. Needless to say that it is also possible first to admix the monomers in the same manner before the polymerization or polycondensation with the agent absorbing ultraviolet rays and then to carry out the polymerization or polycondensation in known manner. It is also possible to spray or mix a polymeric material or resin in powdered or granular form with a solution or dispersion of the agent absorbing ultraviolet light in an appropriate solvent, such as a readily volatile hydrocarbon having any boiling range with the limits between 80° and 220° C., for example, or in another readily volatile solvent, such as acetone, methylethylketone, diethylether, methyl alcohol or ethyl alcohol, ethyl acetate, cyclohexane, cyclohexanol, benzene, tetrahydronaphthalene or anisol, or in water, and subsequently to evaporate the solvent or dispersant, if desired with the application of a raised temperature and/or under reduced pressure. In the case of certain shaped articles, especially thermoplasts, such as films, monofilaments or fibers, the agent absorbing ultraviolet rays may also be incorporated in the finished article. For this purpose, the plastic material may be introduced into a bath containing the agent absorbing ultraviolet rays in an appropriate liquid, for example in one of the solvents or dispersants specified above in the form of a solution or suspension. The plastic material is allowed to remain in the bath for some time, for example for a period ranging from 30 minutes to 24 hours, and exposed, if desired, to a raised temperature which generally should not exceed 100° C. and preferably should not exceed 80° C. Under circumstances, it may be advantageous to stir the material during the treatment. Following the treatment, the material is withdrawn from the bath, after-washed if desired, and dried at room temperature or at a raised temperature, if desired under reduced pressure. Plastic material in the form of fibers or films may also be sprayed with a solution or suspension of the agent absorbing ultraviolet rays in a solvent or dispersant as specified above, or wetted in different manner and subsequently dried.

In the case of lacquers, the agent absorbing ultraviolet rays is advantageously incorporated in the liquid lacquer in powder form or in the form of a solution or dispersion and uniformly distributed, if desired by intense stirring.

The amount of agent absorbing ultraviolet rays to be incorporated in plastic material, resins or lacquers depends on the layer thickness, the nature of the plastic, resin or lacquer and the effect to be produced. The agent is generally added in a proportion of between 0.001% and 5% by weight, preferably between 0.1% and 4% by weight, calculated on the whole mixture. In special cases, it may be advantageous to use the agent absorbing ultraviolet rays in an amount outside the ranges indicated above.

The agents absorbing ultraviolet rays may be added, for example, to the following plastics, resins or lacquer products: olefin polymers, such as polyethylene, polypropylene, polybutene-1, polymers of 4-methylpentene-1, of 5.5-dimethylhexene-1 and of other straight chain or branched α-olefins containing up to 10 carbon atoms, and copolymers obtained from the aforesaid olefins; polyvinyl chloride and copolymers of vinyl chloride with vinyl esters of aliphatic acids, especially vinyl acetate, acrylic acid esters, acrylic acid nitriles, methacrylic acid esters, methacrylic acid nitriles, diene-compounds, such as butadiene, isoprene or 2-chlorobutadiene, or unsaturated dicarboxylic acids or dicarboxylic anhydrides or esters, such as maleic acid, fumaric acid, itaconic acid, citraconic acid, phenylmaleic acid, benzylmaleic acid, ethylmaleic acid, and the anhydrides thereof, or vinylidene chloride; post-chlorinated polyvinyl chloride and post-chlorinated copolymers from vinyl chloride and the aforesaid monomers; polymers from vinyl chloracetate and dichlorodiphenyl ether; polyvinylidene chloride and copolymers from vinylidene chloride and the aforesaid monomers; polyacrylic acid esters, polymethacrylic acid esters, polyacrylonitriles and their chlorination products; polystyrene, polymethylstyrene, polychlorostyrene, polydichlorostyrene, and their chlorination products; polyfluoro-olefins, such as polychlorotrifluoro-ethylene or polytetrafluoroethylene; chlorinated rubber; polyesters, for example from terephthalic acid and glycol; polyamides and polyisocyanates; phenolformaldehyde resins, melamine resins, urea resins, epoxide resins, or alkyd resins; nitrocellulose lacquers, dispersion lacquers based on polyvinyl acetate or boiled linseed oil.

As compounds suitable for use in this invention there may be mentioned more especially:

2-(4'-hydroxyphenyl)-benztriazol-1-oxide (M.P. 233–234° C.)
2-(4'-methoxyphenyl)-benztriazol-1-oxide (M.P. 136° C.)
2-(4'-hydroxphenyl)-benztriazol-1-oxide-3-carboxylic acid (M.P. 269–271° C.)
2-(4'-hydroxyphenyl)-benztriazol-1 - oxide - 3' - carboxylic acid phenylamide (M.P. 251–253° C.)
2-(3'-methyl-4'-hydroxyphenyl)-benztriazol-1-oxide (M.P. 224–225° C.)
2-(3'-chloro-4'-hydroxyphenyl)-benztriazol-1-oxide (M.P. 246–247° C.)
2-(4'-aminophenyl)-benztriazol-1-oxide (M.P. 245–246° C.)
2-(4'-benzoylaminophenyl)-benztriazol-1-oxide (M.P. 230–232° C.)
2-(4'-phenylamino-phenyl)-benztriazol-1-oxide (M.P. 184–185° C.)
2-(4'-dimethylaminophenyl)-benztriazol - 1 - oxide (M.P. 166–167° C.)
2-(4'-hydroxyphenyl)-6-methylbenztriazol-1-oxide (M.P. 244–245° C.)
2-(4'-hydroxyphenyl)-6-chlorobenztriazol-1-oxide (M.P. 221–223° C.)
2-(4'-benzoylsulfoxy-phenyl)-benztriazol-1-oxide (M.P. 138–140° C.)
2-(4'-acetoxy-phenyl)-benztriazol-1-oxide (M.P. 170–171° C.)
2-(4'-benzoyloxyphenyl)-benztriazol-1-oxide (M.P. 174–175° C.)
2-(4'-hydroxyphenyl)-benztriazol-1-oxide-6-sulfonic acid
2-(4'-methoxyphenyl)-benztriazol-1-oxide-6-sulfonic acid The following examples serve to illustrate the invention but they are not intended to limit it thereto:

*Example 1*

138 grams ortho-nitraniline were diazotized in the usual manner. The diazo-solution obtained was united with a solution of 94 grams phenol in 1 liter water and 800 cc. 5 N-sodium hydroxide solution. 212 grams sodium carbonate were added, the whole was heated at 30° C. and 200 grams sodium dithionite (90% strength) were introduced. The mixture was stirred for 10 minutes and the solution was clarified by filtration. The solution was acidified with hydrochloric acid, the precipitated 2-(4'-hydroxyphenyl)-benztriazol-1-oxide was filtered off with suction, washed with water, and dried. The product so obtained was dissolved at 50° C. in two liters water and 300 cc. 5 N-sodium hydroxide solution. To the solution so obtained, 140 grams dimethylsulfate were added dropwise within 30 minutes while stirring well. Stirring was continued for 30 minutes, the precipitated 2-(4'-methoxyphenyl)-benztriazol-1-oxide was separated by filtration, washed with water, and dried.

*Example 2*

A film 0.02 mm. thick prepared on the calender from polyvinyl chloride containing 2% by weight 2-(4'-hydroxyphenyl)-benztriazol-1-oxide had the following permeability to radiation of different wave lengths:

| | |
|---|---|
| 250 m$\mu$=6.3% | 330 m$\mu$=0.07% |
| 260 m$\mu$=5.2% | 340 m$\mu$=0.2% |
| 270 m$\mu$=6% | 350 m$\mu$=1% |
| 280 m$\mu$=6.6% | 360 m$\mu$=5.5% |
| 290 m$\mu$=4.2% | 370 m$\mu$=16% |
| 300 m$\mu$=0.7% | 380 m$\mu$=14% |
| 310 m$\mu$=0.1% | 390 m$\mu$=85% |
| 320 m$\mu$=0.05% | 400 m$\mu$=100% |

The minor influence of polyvinyl chloride on radiation permeability was compensated in this example by a comparison measuring with a film of the same thickness prepared from pure polyvinyl chloride.

*Example 3*

80 parts by weight polyvinyl chloride and 20 parts by weight dibutyl phthalate were intimately mixed with 2 parts by weight 2-(4'-methoxyphenyl)-benztriazol-1-oxide. The mixture so obtained was made into films 0.05 mm. thick. The films so prepared were exposed for 500 hours to the light of an ultraviolet lamp. They were only slightly colored while PVC-films prepared in similar manner in the absence of an agent absorbing ultraviolet rays assumed a brown coloration.

*Example 4*

Powdered polyethylene was mixed with 1% by weight 2-(4'-methoxyphenyl)-benztriazol-1-oxide and the mixture obtained was plasticized for 10 minutes at 160° C. on a roller. The rolled sheets so obtained were made within 10 minutes at 160° C. and under a pressure of 1000 atmospheres into press plates 1 mm. thick, which were exposed to the light of an ultraviolet lamp. After exposure for 260 hours, no embrittlement could be ascertained, while an unstabilized material showed embrittlement.

*Example 5*

A solution of monomeric styrene which contained 0.5 gram 2-(4-methoxyphenyl)-benztriazol-1-oxide was polymerized by heating the solution for 2 days at 100° C. Disks prepared from the polymeric substance so obtained exhibited an improved stability to yellowing in the sunlight as compared with disks made from unstabilized polystyrene.

*Example 6*

A copolymer prepared from 85% vinylidene chloride and 15% vinyl chloride was combined with 5% 2-(4'-benzoylaminophenyl)-benztriazol-1-oxide, calculated upon the polymer, in tetrahydrofurane, the solvent was substantially evaporated, and the resulting mixture was dried for 20 hours at 70° C. From the mass so obtained, a film 0.02 mm. thick was prepared which was exposed to light in a fadeometer. The film was superior as regards discoloration to a film prepared in analogous manner in the absence of an agent absorbing ultraviolet rays.

*Example 7*

15 parts by weight acetyl cellulose, 0.5 part by weight 2-(4'-hydroxyphenyl)-benztriazol-1-oxide and 2 parts by weight dibutyl phthalate were dissolved in 82.7 parts by weight acetone. The solution obtained was poured on to glass and the resulting film was dried at 60° C. The film was unchanged after exposure to light for 500 hours in the fadeometer.

*Example 8*

A polyethylene glycol terephthalate film 0.03 mm. thick was treated for 30 seconds at 20° C. with an acetone solution containing 2% 2-(4'-methoxyphenyl)-benztriazol-1-oxide, and dried for 30 seconds at 180° C. The film so treated was exposed under an ultraviolet lamp and was unchanged when a comparative film free from the agent absorbing ultraviolet light had already undergone embrittlement.

*Example 9*

400 c. methacrylic acid methyl ester were mixed with 100 milligrams benzoylperoxide and 0.4 gram 2-(4'-acetoxyphenyl)-benztriazol-1-oxide. The resulting solution was polymerized in a mould to yield a hard film 1 mm. thick which could be used as a filter absorbing ultraviolet rays.

*Example 10*

Polypropylene powder was homogenized with 0.5% by weight 2-(3'-methyl-4'-hydroxyphenyl)-benztriazol-1-oxide and made, at 275–280° C., into a film 0.12 mm. thick. The film so obtained did not show embrittlement after exposure to light for 200 hours under an ultraviolet lamp.

*Example 11*

0.6 part by weight of the sodium salt of 2-(4'-methoxyphenyl)-benztriazol-1-oxide-6-sulfonic acid were added to 120 parts by weight of a 20% aqueous solution of polyvinyl alcohol. The resulting solution was poured on to glass and dried. A clear film was obtained which substantially absorbed the ultraviolet rays of the sun spectrum.

*Example 12*

20 grams collodium wool were dissolved in a mixture composed of 25 grams butyl alcohol, 25 grams butyl acetate, 25 grams toluene and 5 grams dibutyl phthalate. The solution so obtained was admixed with 0.4 gram 2-(4'-methoxyphenyl)-benztriazol-1-oxide and then exposed to sun light. Discoloration was not observed after exposure for 100 hours.

We claim:
1. A new composition of matter comprising .001% to 5% by weight of said composition of a derivative of a 2-phenyl-benztriazol-1-oxide selected from the group consisting of 2-(4'-hydrophenyl)-benztriazole-1-oxide, 2-(4'-methoxyphenyl)-benztriazole-1-oxide, 2-(4'-hydroxyphenyl)-benztriazol-1-oxide-3-carboxylic acid 2-(4'-hydroxyphenyl)-benztriazol-1-oxide-3-carboxylic acid, 2-(4'-hydroxyphenyl)-benztriazol-1-oxide-3'-carboxylic acid, phenylamide, 2-(3'-methyl-4'-hydroxyphenyl)-benztriazol-1-oxide, 2-(3'-chloro-4'-hydroxyphenyl)-benztriazol-1-oxide, 2-(4'-aminophenyl)-benztriazol-1-oxide, 2-(4'-benzoylaminophenyl)-benztriazol-1-oxide, 2-(4'-phenylaminophenyl)-benztriazol-1-oxide, 2-(4'-dimethylaminophenyl)-benztriazol-1-oxide, 2-(4'-hydroxyphenyl)-6-methylbenztriazol-1-oxide, 2-(4'-hydroxyphenyl)-6-chlorobenztriazol-1-oxide, 2-(4'-benzoylsulfoxy-phenyl)-benztriazol-1-oxide, 2-(4'-acetoxy-phenyl)-benztriazol-1-oxide, 2-(4'-benzoyloxyphenyl)-benztriazol-1-oxide, 2-(4'-hydroxyphenyl)-benztriazol-1-oxide-6-sulfonic acid, and 2-(4'-methoxyphenyl)-benztriazol-1-oxide-6-sulfonic acid, with a carrier selected from the group consisting of polyvinylchloride, polyethylene, polypropylene, polystyrene, a copolymer of vinylidene chloride and vinyl-chloride, acetyl cellulose, polyethylene terephthalate, polyvinyl-alcohol, polymethylacrylic acid methylester and collodium.

2. A new composition of matter comprising .001% to 5% by weight of said composition of a derivative of 2-phenyl-benztriazol-1-oxide having the general formula

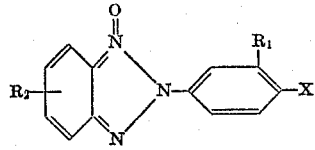

wherein X stands for a member of the group consisting of a hydroxy group, an alkoxy group, an acyloxy group, an arylsulfoxy group, an amino group, an alkyl amino group, a dialkyl amino group, an aryl amino group, a diaryl amino group, an alkyl aryl amino group, an acyl amino group and an arylsulfonyl amino group; $R_1$ stands for a member of the group consisting of a hydrogen atom, a halogen atom, an alkyl group, a carboxylic acid group, a carboxylic acid ester group, and a carboxylic acid amide group; and $R_2$ stands for a member of the group consisting of a hydrogen atom, a halogen atom, an alkyl group, and a sulfonic acid group, with a carrier selected from the group consisting of polyvinylchloride, polyethylene, polypropylene, polystyrene, a copolymer of vinylidene chloride and vinyl-chloride, acetyl cellulose, polyethylene terephthalate, polyvinyl-alcohol, polymethacrylic acid methylester and collodium.

References Cited in the file of this patent

UNITED STATES PATENTS 2,700,044  Sartori _____ Jan. 18, 1955

OTHER REFERENCES

Chem. Abstracts, 1957, vol. 51, col. 10235 (F) (abstract of Monte et al., Recera Sci., vol. 27, pages 123–5 (1957).